US012569705B2

(12) United States Patent
Liu et al.

(10) Patent No.: US 12,569,705 B2
(45) Date of Patent: Mar. 10, 2026

(54) ANTI-PROPYLENE MASK AND METHOD FOR PREPARATION THEREOF

(71) Applicants: NANTONG TEXTILE & SILK IND TECH RES INST, Nantong (CN); SOOCHOW UNIVERSITY, Suzhou (CN)

(72) Inventors: Yuqing Liu, Suzhou (CN); Jing Hu, Suzhou (CN); Yuting Wang, Suzhou (CN); Ranran Li, Suzhou (CN); Xin Yang, Suzhou (CN); Kaiyi Chen, Suzhou (CN)

(73) Assignees: NANTONG TEXTILE & SILK IND TECH RES INST, Nantong (CN); SOOCHOW UNIVERSITY, Suzhou (CN)

( * ) Notice: Subject to any disclaimer, the term of this patent is extended or adjusted under 35 U.S.C. 154(b) by 725 days.

(21) Appl. No.: 18/008,692

(22) PCT Filed: Jun. 8, 2021

(86) PCT No.: PCT/CN2021/098770
§ 371 (c)(1),
(2) Date: Dec. 7, 2022

(87) PCT Pub. No.: WO2021/249365
PCT Pub. Date: Dec. 16, 2021

(65) Prior Publication Data
US 2023/0211190 A1 Jul. 6, 2023

(30) Foreign Application Priority Data

Jun. 10, 2020 (CN) .......................... 202010523109.9

(51) Int. Cl.
*A62B 23/02* (2006.01)
*B01D 39/16* (2006.01)
(Continued)

(52) U.S. Cl.
CPC .......... *A62B 23/025* (2013.01); *B01D 39/163* (2013.01); *B01D 39/2034* (2013.01);
(Continued)

(58) Field of Classification Search
CPC .......... A62B 23/025; B01D 2239/0618; B01D 2239/0627; B01D 2239/065;
(Continued)

(56) References Cited

FOREIGN PATENT DOCUMENTS

| CN | 1330644 A | 1/2002 |
| CN | 103965570 A | 8/2014 |

(Continued)

OTHER PUBLICATIONS

International Search Report for PCT/CN2021/098770, mailed on Oct. 8, 2021.

(Continued)

*Primary Examiner* — Robert Clemente
(74) *Attorney, Agent, or Firm* — Schmeiser, Olsen & Watts LLP

(57) ABSTRACT

An anti-propylene mask and method for preparation thereof is provided; the anti-propylene mask includes a fiber cloth contact layer, an antistatic non-woven fabric layer and a fullerene/nano titanium dioxide spunbond layer which are arranged in sequence; the fullerene/nano titanium dioxide spunbond layer is made by spun-bonding the modified resin material into a fiber web; the raw materials of modified resin materials include matrix resin, carboxylated fullerene derivatives, nano titanium dioxide, a lubricant, and a coupling agent; the modified resin material is prepared by following method: the carboxylated fullerene derivative is mixed and reacted with the nano titanium dioxide to prepare the carboxylated fullerene derivative-modified nano titanium dioxide, which is then blended and extruded with the remaining components in the raw material, and thus pre- (Continued)

Internal

External pared. The mask can prevent propylene from entering the human body through the human respiratory organs and has a good anti-propylene effect.

15 Claims, 1 Drawing Sheet

(51) Int. Cl.

| | |
|---|---|
| *B01D 39/20* | (2006.01) |
| *B32B 5/02* | (2006.01) |
| *B32B 5/26* | (2006.01) |
| *B32B 37/16* | (2006.01) |
| *D01D 1/04* | (2006.01) |
| *D01F 1/10* | (2006.01) |
| *D01F 6/62* | (2006.01) |
| *D04H 1/4291* | (2012.01) |
| *D04H 1/435* | (2012.01) |
| *D04H 1/56* | (2006.01) |
| *D04H 1/724* | (2012.01) |
| *D06M 13/463* | (2006.01) |
| *D06M 101/20* | (2006.01) |

(52) U.S. Cl.

CPC .......... *B01D 39/2065* (2013.01); *B32B 5/022* (2013.01); *B32B 5/267* (2021.05); *B32B 37/16* (2013.01); *D01D 1/04* (2013.01); *D01F 1/10* (2013.01); *D01F 6/62* (2013.01); *D04H 1/4291* (2013.01); *D04H 1/435* (2013.01); *D04H 1/56* (2013.01); *D04H 1/724* (2013.01); *D06M 13/463* (2013.01); *B01D 2239/0618* (2013.01); *B01D 2239/0627* (2013.01); *B01D 2239/10* (2013.01); *B01D 2239/1241* (2013.01); *B32B 2250/20* (2013.01); *B32B 2260/021* (2013.01); *B32B 2260/04* (2013.01); *B32B 2262/0253* (2013.01); *B32B 2262/0284* (2013.01); *B32B 2262/062* (2013.01); *B32B 2264/1022* (2020.08); *B32B 2264/302* (2020.08); *B32B 2305/28* (2013.01); *B32B 2317/10* (2013.01); *B32B 2323/10* (2013.01); *B32B 2367/00* (2013.01); *B32B 2571/00* (2013.01); *D06M 2101/20* (2013.01); *D06M 2200/00* (2013.01); *D10B 2321/022* (2013.01); *D10B 2331/04* (2013.01); *D10B 2505/04* (2013.01)

(58) Field of Classification Search

CPC .......... B01D 2239/0654; B01D 39/163; B01D 39/2034; B01D 39/2065; B32B 37/16

See application file for complete search history.

(56) References Cited

FOREIGN PATENT DOCUMENTS

| | | | |
|---|---|---|---|
| CN | 104083946 | A | 10/2014 |
| CN | 104947321 | A | 9/2015 |
| CN | 104083946 | B * | 6/2016 |
| CN | 108946699 | A | 12/2018 |
| CN | 111716841 | A | 9/2020 |
| WO | 2017047980 | A1 | 3/2017 |

OTHER PUBLICATIONS

Fengshu, Yue High Efficiency Photocatalytic Performance of Ultra-thin Titanium Dioxide Nanocomposite Modified by Carboxylated Fullerenes.

* cited by examiner

Internal
External

ANTI-PROPYLENE MASK AND METHOD FOR PREPARATION THEREOF

CROSS-REFERENCE TO RELATED APPLICATIONS

This application claims priority to PCT Application No. PCT/CN2021/098770, having a filing date of Jun. 8, 2021, which claims priority to CN Application No. 202010523109.9, having a filing date of Jun. 10, 2020, the entire contents both of which are hereby incorporated by reference.

FIELD OF TECHNOLOGY

The following belongs to the field of safety and hygienic protection, and specifically to an anti-propylene mask and method for preparation thereof.

BACKGROUND

With the rapid development of industrialization and urbanization in our country and the continuous growth of energy consumption, one of the problems our society is facing today is: volatile propylene poses risks to human health and the environment, and this type of gas volatiles enters the human body through the respiratory organs, can damage the nervous system and is strongly carcinogenic, however, there are currently few protective measures against propylene inhalation through respiratory organs. Therefore, great efforts are being made by the scientific community to remove and guard against this type of toxic gas. The traditional removal method is achieved by catalytic combustion, but this method requires high temperature and high pressure for complete oxidation, and is not suitable for human safety protection. In addition, chemical and physical adsorption principles are also used to control the diffusion of propylene gas, but this method often uses large equipment and is inconvenient to use. Therefore, the methods and measures to prevent propylene from entering the human body through the respiratory organs under the condition of simple conditions and convenient use have excellent practical significance.

SUMMARY

An aspect relates to a new mask with anti-propylene function, which is not only easy to use but also convenient to carry, and can prevent propylene from entering the human body through the human respiratory organs, has a good anti-propylene effect, and further has an antistatic function, and is particularly suitable for use in a propylene production workshop.

Meanwhile, the present disclosure further provides a method for preparation of the anti-propylene mask described above.

To solve the above technical problems, a technical solution employed by the present disclosure is as follows: an anti-propylene mask, the anti-propylene mask comprises a fiber cloth contact layer, an antistatic non-woven fabric layer, and a fullerene/nano titanium dioxide spunbond layer which are arranged in sequence; wherein, the fullerene/nano titanium dioxide spunbond layer is made by spun-bonding a modified resin material into a fiber web, the raw materials of the modified resin material comprise matrix resin, a carboxylated fullerene derivative, nano titanium dioxide, a lubricant, and a coupling agent, the modified resin material is prepared by the following method: mixing and reacting a carboxylated fullerene derivative with nano titanium dioxide to prepare carboxylated fullerene derivative-modified nano titanium dioxide, then blending extruding the carboxylated fullerene derivative-modified nano titanium dioxide with the remaining components in the raw material to prepare.

According to some aspects of the present disclosure, the feeding mass ratio of the matrix resin, the carboxylated fullerene derivative, nano titanium dioxide, the lubricant, and the coupling agent is 1:(0.02-0.14):(0.16-0.45):(0.0005-0.002):(0.0001-0.001).

In an embodiment, the feeding mass ratio of the matrix resin, the carboxylated fullerene derivative, nano titanium dioxide, the lubricant, and the coupling agent is 1:(0.05-0.13):(0.16-0.40):(0.0005-0.0018):(0.0001-0.0008).

According to some aspects of the present disclosure, the feeding mass ratio of the carboxylated fullerene derivative to nano titanium dioxide is 1:(1.5-5.0). In an embodiment, the feeding mass ratio of the carboxylated fullerene derivative to nano titanium dioxide is 1:(2-4).

According to some specific aspects of the present disclosure, the matrix resin is selected from the group consisting of polyethylene terephthalate (PET), polybutylene terephthalate (PBT), polyarylate (PAR), and combinations thereof. In an embodiment, the matrix resin is polyethylene terephthalate.

According to the present disclosure, the carboxylated fullerene derivative can be obtained commercially or prepared according to conventional methods in the art.

According to a specific aspect of the present disclosure, the carboxylated fullerene derivative is purchased from Nanjing XFNANO materials Tech Co., Ltd., No. XFC08.

According to some aspects of the present disclosure, the average particle size of the nano titanium dioxide is 150-200 nm.

According to some aspects of the present disclosure, the antistatic non-woven fabric layer is formed by adhering an antistatic agent on polypropylene melt-blown cloth by spraying, immersing or brushing, and the antistatic agent is a cationic antistatic agent, a nonionic antistatic agent, or a combination thereof.

According to some specific and aspects of the present disclosure, the antistatic agent comprises quaternary ammonium salts (e.g., alkyl tertiary amine nitrate antistatic agent, etc.), non-ionic antistatic agents (e.g., ethoxylated stearphthalamide, etc.).

According to some specific and aspects of the present disclosure, the carboxylated fullerene derivative-modified nano titanium dioxide is prepared by the following method: adding the carboxylated fullerene derivative and nano titanium dioxide into absolute ethanol, ultrasonically dispersing to obtain a mixed solution, and maintaining the temperature and reacting the mixed solution at 95-105° C., cooling, centrifuging, washing, and drying to prepare.

According to some implementations of the present disclosure, the carboxylated fullerene derivative-modified nano titanium dioxide is prepared by the following method:

(a) weighing the carboxylated fullerene derivative and nano titanium dioxide according to the formula ratio; then adding the weighed carboxylated fullerene derivative and nano titanium dioxide into absolute ethanol (the mass fraction is 2-5%), forming a mixed solution under ultrasonic condition; then placing the obtained mixed solution into a reactor, and reacting the mixed solution and maintaining the temperature at 95-105° C. for 10-20 h; cooling to give a reaction mixture;

(b) preparation of the carboxylated fullerene derivative-modified nano titanium dioxide: centrifugally filtering the mixture prepared in step (a); then washing with deionized water and absolute ethanol, respectively; then drying in an oven at 30-50° C., to give the carboxylated fullerene derivative-modified nano titanium dioxide, which is in powder form.

According to some aspects of the present disclosure, the temperature of the blending extrusion is 190-260° C.

According to some specific aspects of the present disclosure, the material of the fiber cloth contact layer is cotton.

According to some specific aspects of the present disclosure, the lubricant may be lubricant HI-LUBE and the like, and the coupling agent may be coupling agent KH550 and the like.

Another technical solution provided by the present disclosure: a method for the preparation of the above-mentioned anti-propylene mask, the preparation method comprises the following steps:

(1) mixing and reacting the carboxylated fullerene derivative with nano titanium dioxide to prepare the carboxylated fullerene derivative-modified nano titanium dioxide;

(2) blending extruding the carboxylated fullerene derivative-modified nano titanium dioxide prepared in step (1) with a dried matrix resin and the remaining components in the raw material to prepare the modified resin material;

(3) spun-bonding the modified resin material prepared in step (2) into a fiber web, and making the fiber web into the fullerene/nano titanium dioxide spunbond layer;

(4) preparation of the antistatic non-woven layer: mixing the antistatic agent with water to prepare an antistatic agent solution, and then adhering the antistatic agent solution on the polypropylene melt-blown cloth by spraying, immersing, or brushing, and drying to prepare;

(5) sequentially stacking the fiber cloth contact layer, the antistatic non-woven fabric layer prepared in step (4), and the fullerene/nano titanium dioxide spunbond layer prepared in step (3) to make the anti-propylene mask.

According to some specific aspects of the present disclosure, after sequentially stacking the fiber cloth contact layer, the antistatic non-woven fabric layer prepared in step (4), and the fullerene/nano titanium dioxide spunbond layer prepared in step (3), they can be made into the anti-propylene mask by stitching, hot melting or the like.

According to some aspects of the present disclosure, in step (2), the temperature of the blending extrusion is 190-260° C.

According to some specific aspects of the present disclosure, in step (2), the screw speed of the blending extrusion is 80-260 rpm.

Due to the use of the above technical solutions, the present disclosure has the following advantages over the conventional art:

Aiming at the problems of harsh conditions and inconvenient use in the process of eliminating propylene pollutants in the conventional art, the present disclosure innovatively provides a new type of mask, which can have the function of preventing and/or precluding propylene from entering the human body through respiratory organs. On the one hand, compared with the existing large-scale equipment for eliminating propylene, the present disclosure is simple and lightweight, can be carried around, and the user's daily activities will not be restricted; on the other hand, since the propylene production workshop needs antistatic treatment, the mask of the present disclosure also has an antistatic effect, which can effectively prevent propylene poisoning and prevent accidents caused by static electricity, which has excellent practical significance.

Wherein, in the mask of the present disclosure, the inventor of the present disclosure innovatively adopted a specific modified resin material, the raw materials of which comprise a resin matrix, a carboxylated fullerene derivative, and nano titanium dioxide, etc., and the spunbond layer spunbonding from the specific resin is used as the outermost layer of the mask, which can utilize the photocatalytic oxidation performance of titanium dioxide to achieve complete oxidation of propylene in the air (especially suitable for low-concentration propylene). In particular, the addition of fullerene expands the visible light absorption spectrum of titanium dioxide, so that titanium dioxide can excite its photocatalytic oxidation performance under the conditions of solar/visible light radiation or LED lamp irradiation, and the photocatalytic conditions are simpler and more convenient. At the same time, the photocatalytic performance of fullerene itself synergies with titanium dioxide, so that titanium dioxide eliminates propylene more efficiently. Further, it is worth noting that the addition of fullerene does not affect the breathability of the mask.

In addition, the mask of the present disclosure has a stable elimination effect on propylene, and hardly occurs the phenomenon that the effective components of the mask are released during friction processes such as transporting and stacking.

BRIEF DESCRIPTION

Some of the embodiments will be described in detail, with references to the following FIGURES, wherein like designations denote like members, wherein:

FIG. 1 is a structural schematic diagram of the anti-polypropylene in Embodiment 7 of the present disclosure;

wherein, 1, fiber cloth contact layer; 2, antistatic non-woven fabric layer; 3, fullerene/nano titanium dioxide spunbond layer.

DETAILED DESCRIPTION

In the following, the specific embodiments are combined to further explain the present disclosure in detail. It should be understood that, those embodiments are to explain the basic principle, major features and advantages of the present disclosure, and the present disclosure is not limited by the scope of the following embodiments. The implementation conditions employed by the embodiments may be further adjusted according to particular requirements, and undefined implementation conditions usually are conditions in conventional experiments.

In the following, unless otherwise specified, all raw materials are basically commercially available or prepared by conventional methods in the field. In the following embodiments, carboxylated fullerene derivatives were purchased from Nanjing XFNANO materials Tech Co., Ltd., No. XFC08; the average particle size of nano titanium dioxide was about 170 nm; polyethylene terephthalate was purchased from DuPont Company in the United States, brand FR543; lubricant was lubricant HI-LUBE, purchased from HARVES company in Japan; the coupling agent was Coupling agent KH550, purchased from Nanjing Jingtianwei Chemical Co., Ltd.

Embodiment 1: Preparation of Fullerene/Nano
Titanium Dioxide Spunbond Layer

This embodiment provided a fullerene/nano titanium dioxide spunbond layer, which was made by spun-bonding a modified resin material into a fiber web, in parts by mass, the raw materials of modified resin material included 5 parts of carboxylated fullerene derivative, 15 parts of nano titanium dioxide, 79.925 parts of polyethylene terephthalate (PET), 0.0525 parts of lubricant, and 0.0225 parts of coupling agent.

The method for the preparation thereof was:

(1) The carboxylated fullerene derivative and nano titanium dioxide were weighed according to the formula ratio; then the weighed carboxylated fullerene derivative and nano titanium dioxide were added into absolute ethanol (the mass fraction is 3%), to form a mixed solution under ultrasonic condition; then the obtained mixed solution was put into a reactor, and the temperature was maintained at 100° C. for 12 h; the system was cooled to give a reaction mixture;

(2) The reaction mixture prepared in step (1) was centrifugally filtered; then washed with deionized water and absolute ethanol for twice, respectively; then dried in an oven at 40° C. overnight, to give the carboxylated fullerene derivative-modified nano titanium dioxide, which was in powder form;

(3) PET was weighed according to the formula ratio, and put in an oven at 80° C. to dry for 12 h;

(4) The carboxylated fullerene derivative-modified nano titanium dioxide prepared in step (2), the dry PET prepared in step (3), and the lubricant and the coupling agent were put into a screw extruder for co-blending, the screw speed was 90 rpm, and the temperature was set at 200° C. to give a modified resin material;

(5) The modified resin material prepared in step (4) was spun-bonded into a fiber web, and the fiber web was made into a spunbond cloth, i.e., the fullerene/nano titanium dioxide spunbond layer.

The fullerene/nano titania spunbond layer obtained in this embodiment had a certain absorption in the light wavelength range of 0-600 nm, wherein 400-600 nm is the visible light region.

Embodiment 2: Preparation of Fullerene/Nano
Titanium Dioxide Spunbond Layer

This embodiment provided a fullerene/nano titanium dioxide spunbond layer, which was made by spun-bonding a modified resin material into a fiber web, in parts by mass, the raw materials of modified resin material included 7 parts of carboxylated fullerene derivative, 20 parts of nano titanium dioxide, 72.9 parts of polyethylene terephthalate (PET), 0.07 parts of lubricant, and 0.03 parts of coupling agent.

The method for the preparation thereof was:

(1) The carboxylated fullerene derivative and nano titanium dioxide were weighed according to the formula ratio; then the weighed carboxylated fullerene derivative and nano titanium dioxide were added into absolute ethanol (the mass fraction is 3%), to form a mixed solution under ultrasonic condition; then the obtained mixed solution was put into a reactor, and the temperature was maintained at 100° C. for 12 h; the system was cooled to give a reaction mixture;

(2) The reaction mixture prepared in step (1) was centrifugally filtered; then washed with deionized water and absolute ethanol for twice, respectively; then dried in an oven at 40° C. overnight, to give the carboxylated fullerene derivative-modified nano titanium dioxide, which was in powder form;

(3) PET was weighed according to the formula ratio, and put in an oven at 80° C. to dry for 12 h;

(4) The carboxylated fullerene derivative-modified nano titanium dioxide prepared in step (2), the dry PET prepared in step (3), and the lubricant and the coupling agent were put into a screw extruder for co-blending, the screw speed was 80 rev/min, and the temperature was set at 210° C. to give a modified resin material;

(5) The modified resin material prepared in step (4) was spun-bonded into a fiber web, and the fiber web was made into a spunbond cloth, i.e., the fullerene/nano titanium dioxide spunbond layer.

The fullerene/nano titania spunbond layer obtained in this embodiment had a certain absorption in the light wavelength range of 0-800 nm, wherein 400-800 nm is the visible light region.

Embodiment 3: Preparation of Fullerene/Nano
Titanium Dioxide Spunbond Layer

This embodiment provided a fullerene/nano titanium dioxide spunbond layer, which was made by spun-bonding a modified resin material into a fiber web, in parts by mass, the raw materials of modified resin material included 8 parts of carboxylated fullerene derivative, 24 parts of nano titanium dioxide, 67.88 parts of polyethylene terephthalate (PET), 0.084 parts of lubricant, and 0.036 parts of coupling agent.

The method for the preparation thereof was:

(1) The carboxylated fullerene derivative and nano titanium dioxide were weighed according to the formula ratio; then the weighed carboxylated fullerene derivative and nano titanium dioxide were added into absolute ethanol (the mass fraction is 3%), to form a mixed solution under ultrasonic condition; then the obtained mixed solution was put into a reactor, and the temperature was maintained at 100° C. for 12 h; the system was cooled to give a reaction mixture;

(2) The reaction mixture prepared in step (1) was centrifugally filtered; then washed with deionized water and absolute ethanol for twice, respectively; then dried in an oven at 40° C. overnight, to give the carboxylated fullerene derivative-modified nano titanium dioxide, which was in powder form;

(3) PET was weighed according to the formula ratio, and put in an oven at 80° C. to dry for 12 h;

(4) The carboxylated fullerene derivative-modified nano titanium dioxide prepared in step (2), the dry PET prepared in step (3), and the lubricant and the coupling agent were put into a screw extruder for co-blending, the screw speed was 100 rev/min, and the temperature was set at 190° C. to give a modified resin material;

(5) The modified resin material prepared in step (4) was spun-bonded into a fiber web, and the fiber web was made into a spunbond cloth, i.e., the fullerene/nano titanium dioxide spunbond layer.

The fullerene/nano titania spunbond layer obtained in this embodiment had a certain absorption in the light wavelength range of 0-900 nm, wherein 400-900 nm is the visible light region.

Embodiment 4: Preparation of Antistatic
Non-Woven Fabric Layer

This embodiment provided an antistatic non-woven fabric layer, and the method for the preparation thereof was:

(1) Antistatic agent alkyl tertiary amine nitrate (i.e., antistatic agent SN, purchased from Wuhan Huaxiang Kejie Biotechnology Co., Ltd.) was diluted with water to form an antistatic solution with a concentration of 0.5%;

(2) The polypropylene melt-blown cloth was immersed in the antistatic solution prepared in step (1) and stood for 4 h;

(3) The non-woven fabric with the antistatic agent prepared in step (2) was put into an oven for heating and drying, and the oven temperature was set to 100° C., to obtain an antistatic non-woven fabric layer.

Embodiment 5: Preparation of Antistatic Non-Woven Fabric Layer

This embodiment provided an antistatic non-woven fabric layer, and the method for the preparation thereof was:

(1) Ethoxylated stearylamine (purchased from Nanjing Ruichuang Chemical Technology Co., Ltd., model AC-1820) was diluted with water to form an antistatic solution with a concentration of 0.8%;

(2) The antistatic solution prepared in step (1) was evenly brushed on the surface of the polypropylene melt-blown cloth;

(3) The non-woven fabric with the antistatic agent prepared in step (2) was put into an oven for heating and drying, and the oven temperature was set to 110° C., to obtain an antistatic non-woven fabric layer.

Embodiment 6: Preparation of Antistatic Non-Woven Fabric Layer

This embodiment provided an antistatic non-woven fabric layer, and the method for the preparation thereof was:

(1) Antistatic agent alkyl tertiary amine nitrate and ethoxylated stearylamine were diluted with water to form an antistatic solution with a concentration of 1%, wherein the mass ratio of the antistatic agent alkyl tertiary amine nitrate to ethoxylated stearylamine was 1:1;

(2) The antistatic solution prepared in step (1) was adhered to the surface of the polypropylene melt-blown cloth by spraying;

(3) The non-woven fabric with the antistatic agent prepared in step (2) was put into an oven for heating and drying, and the oven temperature was set to 120° C., to obtain an antistatic non-woven fabric layer.

Embodiment 7: Preparation of Anti-Polypropylene Mask

This embodiment provided an anti-polypropylene mask, which included a fullerene/nano titanium dioxide spunbond layer, an antistatic non-woven fabric layer, and a fiber cloth contact layer (cotton layer) from the outside to the inside.

The method for the preparation thereof was:

The fullerene/nano titanium dioxide spunbond layer prepared in Embodiment 1, the antistatic non-woven fabric layer prepared in Embodiment 4, and the fiber cloth contact layer were stacked and stitched in order from the outside to the inside to obtain an anti-polypropylene mask.

Embodiment 8: Preparation of Anti-Polypropylene Mask

This embodiment provided an anti-polypropylene mask, which included a fullerene/nano titanium dioxide spunbond layer, an antistatic non-woven fabric layer, and a fiber cloth contact layer (cotton layer) from the outside to the inside.

The method for the preparation thereof was:

The fullerene/nano titanium dioxide spunbond layer prepared in Embodiment 2, the antistatic non-woven fabric layer prepared in Embodiment 5, and the fiber cloth contact layer were stacked and stitched in order from the outside to the inside to obtain an anti-polypropylene mask.

Embodiment 9: Preparation of Anti-Polypropylene Mask

This embodiment provided an anti-polypropylene mask, which included a fullerene/nano titanium dioxide spunbond layer, an antistatic non-woven fabric layer, and a fiber cloth contact layer (cotton layer) from the outside to the inside.

The method for the preparation thereof was:

The fullerene/nano titanium dioxide spunbond layer prepared in Embodiment 3, the antistatic non-woven fabric layer prepared in Embodiment 6, and the fiber cloth contact layer were stacked and stitched in order from the outside to the inside to obtain an anti-polypropylene mask.

Embodiment 10: Propylene Conversion Rate Measurement

The anti-propylene mask prepared in Embodiment 7 were detected according to the following method, and the specific detection method was:

(1) The prepared anti-propylene mask was fixed in a transparent glass container with an inlet and outlet, the volume of the container was 1 L, and the transparent container was blocked into two spaces by the mask;

(2) Under the condition of solar visible light radiation, the inlet on one side was connected to a stream containing propylene, the propylene concentration was diluted to 110 ppmv, and the flow rate was set to 5 ml/min; the outlet on the other side was connected to a GC chromatograph with a CTR-1 column operating at 30° C.;

(3) After 5 min, the GC chromatography was used to track the changes of propylene and $CO_2$ concentrations in the outlet gas, and the propylene conversion rate was calculated according to the following formula: propylene conversion rate (%)=(initial propylene concentration−propylene concentration measured at the outlet)/initial propylene concentration×100%, and the result showed that the conversion rate of propylene was about 98.6%.

Embodiment 11: Propylene Conversion Rate Measurement

The anti-propylene mask prepared in Embodiment 8 were detected according to the following method, and the specific detection method was:

(1) The prepared anti-propylene mask was fixed in a transparent glass container with an inlet and outlet, the volume of the container was 1 L, and the transparent container was blocked into two spaces by the mask;

(2) Under the irradiation of an LED lamp with an output power of 1 w/cm², the inlet on one side was connected to a stream containing propylene, the propylene concentration was diluted to 100 ppmv, and the flow rate was set to 6 ml/min; the outlet on the other side was connected to a GC chromatograph with a CTR-1 column operating at 30° C.;

(3) After 5 min, the GC chromatography was used to track the changes of propylene and $CO_2$ concentrations in the outlet gas, and the propylene conversion rate was calculated according to the following formula: propylene conversion rate (%)=(initial propylene concentration−propylene concentration measured at the outlet)/initial propylene concentration×100%, and the result showed that the conversion rate of propylene was about 99.1%.

Embodiment 12: Propylene Conversion Rate Measurement

The anti-propylene mask prepared in Embodiment 9 were detected according to the following method, and the specific detection method was:

(1) The prepared anti-propylene mask was fixed in a transparent glass container with an inlet and outlet, the volume of the container was 1 L, and the transparent container was blocked into two spaces by the mask;

(2) Under the condition of solar visible light radiation, the inlet on one side was connected to a stream containing propylene, the propylene concentration was diluted to 90 ppmv, and the flow rate was set to 7 ml/min; the outlet on the other side was connected to a GC chromatograph with a CTR-1 column operating at 30° C.;

(3) After 5 min, the GC chromatography was used to track the changes of propylene and $CO_2$ concentrations in the outlet gas, and the propylene conversion rate was calculated according to the following formula: propylene conversion rate (%)=(initial propylene concentration−propylene concentration measured at the outlet)/initial propylene concentration×100%, and the result showed that the conversion rate of propylene was approximate 100%.

It can be seen from the above embodiments that the anti-propylene mask of the present disclosure can oxidize propylene with high efficiency under the conditions of solar/visible light radiation or LED lamp irradiation, which greatly reduces the possibility of propylene poisoning for users. At the same time, the photocatalytic oxidation conditions are simple and convenient, the breathability of the mask will not be affected by fullerene, no toxic components are produced during the oxidation process, and the mask is a green and environmentally friendly functional product.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An anti-propylene mask comprising:
a fiber cloth contact layer;
an antistatic non-woven fabric layer; and
a fullerene/nano titanium dioxide spunbond layer which are arranged in sequence; the fullerene/nano titanium dioxide spunbond layer is made by spun-bonding a modified resin material into a fiber web;
wherein:
raw materials of the modified resin material comprise a matrix resin, a carboxylated fullerene derivative, nano titanium dioxide, a lubricant, and a coupling agent, a feeding mass ratio of the matrix resin, the carboxylated fullerene derivative, nano titanium dioxide, the lubricant, and the coupling agent is 1: (0.02-0.14): (0.16-0.45): (0.0005-0.002): (0.0001-0.001), a feeding mass ratio of the carboxylated fullerene derivative to nano titanium dioxide is 1: (1.5-5.0), the matrix resin is selected from a group consisting of: polyethylene terephthalate, polybutylene terephthalate, polyarylate and combinations thereof, an average particle size of the nano titanium dioxide is 150-200 nm;

modified resin material is prepared by mixing and reacting a carboxylated fullerene derivative with nano titanium dioxide to prepare carboxylated fullerene derivative-modified nano titanium dioxide, then blending extruding the carboxylated fullerene derivative-modified nano titanium dioxide with a remaining components in the raw material to prepare, where a temperature of the blending extrusion is 190-260° C.

2. An anti-propylene mask, characterized comprising:
a fiber cloth contact layer; and
a fullerene/nano titanium dioxide spunbond layer, wherein; the fullerene/nano titanium dioxide spunbond layer is made by spun-bonding a modified resin material into a fiber web, the raw materials of the modified resin material comprising matrix resin, a carboxylated fullerene derivative, nano titanium dioxide, a lubricant, and a coupling agent, the modified resin material is prepared by mixing and reacting a carboxylated fullerene derivative with nano titanium dioxide to prepare carboxylated fullerene derivative-modified nano titanium dioxide, then blending extruding the carboxylated fullerene derivative-modified nano titanium dioxide with the remaining components in the raw material to prepare.

3. The anti-propylene mask according to claim 2, wherein that a feeding mass ratio of the matrix resin, the carboxylated fullerene derivative, nano titanium dioxide, the lubricant, and the coupling agent is 1: (0.02-0.14): (0.16-0.45): (0.0005-0.002): (0.0001-0.001).

4. The anti-propylene mask according to claim 3, wherein that, the feeding mass ratio of the matrix resin, the carboxylated fullerene derivative, nano titanium dioxide, the lubricant, and the coupling agent is:
1: (0.05-0.13): (0.16-0.40): (0.0005-0.0018): (0.0001-0.0008).

5. The anti-propylene mask according to claim 2, wherein a feeding mass ratio of the carboxylated fullerene derivative to nano titanium dioxide is 1: (1.5-5.0).

6. The anti-propylene mask according to claim 5, wherein the feeding mass ratio of the carboxylated fullerene derivative to nano titanium dioxide is 1: (2-4).

7. The anti-propylene mask according to claim 2, wherein the matrix resin is selected from a group consisting of; polyethylene terephthalate polybutylene terephthalate, polyarylate, and combinations thereof.

8. The anti-propylene mask according to claim 7, wherein the matrix resin is polyethylene terephthalate.

9. The anti-propylene mask according to claim 2, wherein an average particle size of the nano titanium dioxide is 150-200 nm.

10. The anti-propylene mask according to claim 2, further comprising an antistatic non-woven fabric layer arranged between the fiber cloth contact layer and the fullerene/nano titanium dioxide spunbond layer.

11. The anti-propylene mask according to claim 10, wherein the antistatic non-woven fabric layer is formed by adhering an antistatic agent on polypropylene melt-blown cloth by spraying, immersing or brushing, and the antistatic agent is a cationic antistatic agent, a nonionic antistatic agent, or a combination thereof.

12. The anti-propylene mask according to claim 2, wherein the carboxylated fullerene derivative-modified nano titanium dioxide is prepared by adding the carboxylated fullerene derivative and nano titanium dioxide into absolute ethanol, ultrasonically dispersing to obtain a mixed solution, and maintaining a temperature and reacting the mixed solution at 95-105° C., cooling, centrifuging, washing, and drying to prepare.

13. The anti-propylene mask according to claim 2, wherein she a temperature of the blending extrusion is 190-260° C.

14. The anti-propylene mask according to claim 2, wherein a material of the fiber cloth contact layer is cotton.

15. A method for the preparation of an anti-propylene mask according to claim 2, wherein the preparation method comprises (1) mixing and reacting the carboxylated fullerene derivative with nano titanium dioxide to prepare the carboxylated fullerene derivative-modified nano titanium dioxide;

(2) blending extruding the carboxylated fullerene derivative-modified nano titanium dioxide prepared in step (1) with a dried matrix resin and the remaining components in the raw material to prepare the modified resin material;

(3) spun-bonding the modified resin material prepared in step (2) into a fiber web, and making the fiber web into the fullerene/nano titanium dioxide spunbond layer;

(4) preparation of the antistatic non-woven layer: mixing the antistatic agent with water to prepare an antistatic agent solution, and then adhering the antistatic agent solution on the polypropylene melt-blown cloth by spraying, immersing, or brushing, and drying to prepare; and (5) sequentially stacking the fiber cloth contact layer, the antistatic non-woven fabric layer prepared in step (4), and the fullerene/nano titanium dioxide spunbond layer prepared in step (3) to make the anti-propylene mask.

* * * * *